Feb. 10, 1925.
J. E. PERRAULT
SLITTING MACHINE
Filed Aug. 7, 1923
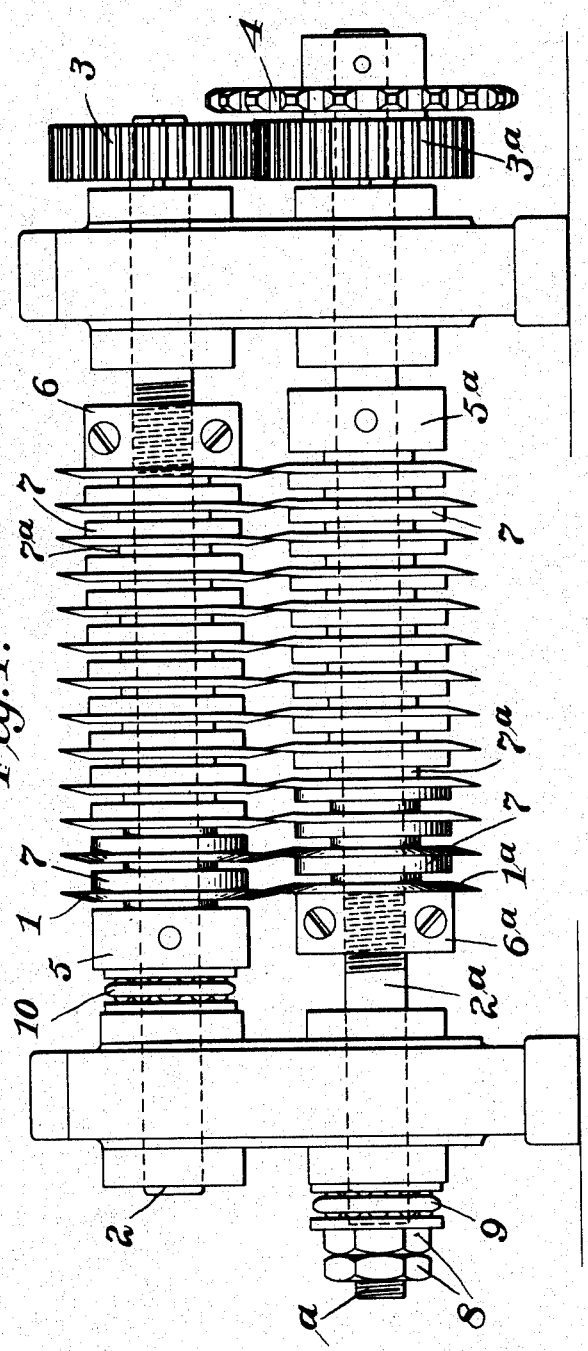
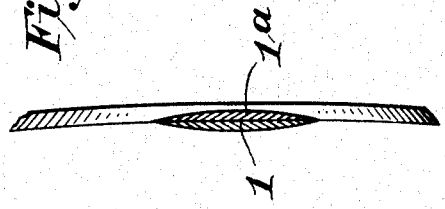
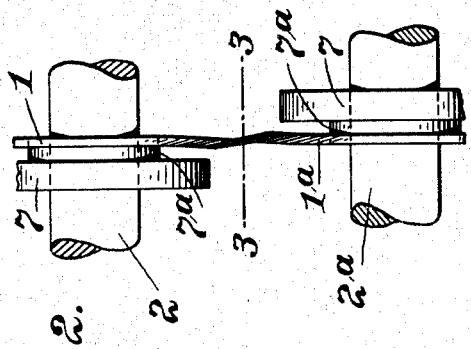
Inventor:
Joseph E. Perrault, Patented Feb. 10, 1925.

1,525,590

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

SLITTING MACHINE.

Application filed August 7, 1923. Serial No. 656,198.

*To all whom it may concern:*

Be it known that I, JOSEPH E. PERRAULT, a citizen of the United States, and resident of Watertown, in the county of Middlesex and State of Massachusetts, have invented certain new and useful Improvements in Slitting Machines, of which the following is a specification.

My said invention relates to improvements in cutting or slitting machines intended to operate upon traveling sheets, and is designed more particularly for embodiment in apparatus having a plurality of pairs of cooperative cutters adapted to slit such a sheet into relatively narrow strips or ribbons.

Heretofore it has been customary to use fairly stiff blades supported against axial movement upon a carrying shaft by separators or spacers extended well out towards the cutting edges; this method of mounting requiring the cooperating edges of the cutters to be directly in line. One objection to such a mounting is that it requires very accurate machining of the collars or knives, or an adjustment of the collars whenever blades of commercial tolerances in thickness are used. Another objection is that in order to prevent separation of the blades by the material during cutting, or the material being forced in between the blades with resultant irregular cutting, heavy blades and large collars have been necessary.

The present invention aims to avoid these objections, and the invention includes the novel features of construction and arrangement of parts hereinafter described, and defined by the appended claims.

An embodiment of my invention is shown in the accompanying drawings, in which:—

Figure 1 is a slitting machine constructed in accordance with my invention, and

Fig. 2 is a detail view of two of the cooperating cutters on a larger scale.

Fig. 3 is an enlarged sectional detail on line 3—3 of Fig. 2, illustrating in an exaggerated way the flexing of the two cutters.

Referring by reference characters to this drawing, the numerals 1 and $1^a$ designate the cooperating disc cutters, of which there may be any desired number according to the the number of strips into which the sheet is to be severed. These cutters or blades are of circular or disc form provided with beveled edges, as shown, and they are placed in reverse position upon carrying shafts 2 and $2^a$, which shafts are geared together by gears 3 and $3^a$, one of which, as for instance $3^a$, constitutes the driving shaft and may be driven from any suitable source of power and by any suitable means of which the spocket wheel 4 is an example. Each shaft is provided with fixed collars 5 and $5^a$ respectively, and with adjustable collars 6 and $6^a$, the blades or disc cutters and the interposed spacing discs 7 being clamped between the fixed collars 5, $5^a$ and the adjustable collars 6, $6^a$ respectively. It will be observed that the cutting discs and collars are reversely placed on the two shafts so that the unbeveled faces of the cutting discs face in opposite directions. The cutting discs employed according to the present invention, are made of sufficiently thin steel to be resilient or capable of being flexed, as shown more clearly in Fig. 2, and to permit such flexing the spacing collars are stepped down, as indicated at $7^a$. With the cutters and spacing members assembled on the shaft, as shown in Fig. 1, and properly clamped between the stationary and movable collars 5, $5^a$ and 6 $6^a$, it will be seen that if shaft $2^a$, for example, is moved axially towards the left, all of the cutting discs $1^a$ will be carried with it and the edge portions which overlap the corresponding edges of the cutters 1 will be flexed to the right, the corresponding overlapping portions of cutters 1 being flexed to the left. This movement is accomplished by making the shaft $2^a$ movable longitudinally in its bearings and providing it with a screw threaded end $a$ to which is applied an adjusting nut or nuts 8 cooperating with a thrust bearing 9. The shaft 2 is provided with a corresponding thrust bearing, as indicated at 10. As not a great amount of longitudinal movement is necessary to secure the results aimed at, the necessary movement may be permitted without interfering with the travelling connections by making the gears 3 and $3^a$ wide enough so that ample engagement is provided, or spline connections may be used, as is commonly done in the machine art.

By making the discs resilient and mounting them as above described, it is not necessary to use as much accuracy in the machining of the collars or the knives, and ordinary shop tolerances are satisfactory, as by the endwise adjustment of one of the shafts relative to the other, and the deflection of the blades or discs as stated, all the discs of one shaft are held pressed against the discs of the adjacent shaft with sufficient firmness to give a smooth accurate cut and without any danger of the material being forced in between the edges of the cutters.

Having thus described my invention, what I claim is:—

1. In apparatus for cutting travelling sheets into strips, a pair of cutting discs of resilient material having overlapping cooperating edges, rotary shafts carrying such discs, and associated means for holding said discs with their overlapping portions in flexed relation.

2. In combination, a pair of substantially parallel shafts, a plurality of resilient cutting discs fixed on each shaft, the discs of one shaft overlapping the discs of the adjacent shaft and means for exerting pressure in an axial direction against the discs of one shaft whereby the overlapping portions of both sets of discs are flexed.

3. In combination, a pair of substantially parallel shafts, means for driving the same, a plurality of spaced resilient cutting discs rigidly clamped on each shaft, the discs of one shaft having portions overlapping the edges of the discs of the other shafts, and means for imparting endwise movement to one of the shafts whereby the overlapping portions of all of the discs on both shafts are flexed into planes inclined to the planes of the main portions of the discs.

4. In combination, a pair of rotatable shafts, resilient disc cutters rigidly carried by said shafts having overlapping portions, and means for adjusting one of said shafts axially relative to the other, whereby the overlapping portions of the cutters are displaced into planes inclined to the planes of the remaining portions of the cutters.

5. In combination, a pair of rotatable shafts, a plurality of resilient disc cutters rigidly carried by each shaft, the discs of one shaft overlapping the discs of the other shaft, and means for adjusting one of said shafts axially relative to the other, whereby the overlapping portions of the discs are displaced into planes inclined to the planes of the remaining portions of the discs.

6. In a sheet cutting apparatus, a pair of overlapping cutting discs of resilient sheet material mounted to rotate about fixed parallel axes, the relative position of the discs being such that the overlapping portions are resiliently flexed into planes inclined to the planes of the remaining portions of the discs.

In testimony whereof, I affix my signature.

JOSEPH E. PERRAULT.